Dec. 6, 1932.   L. TRIOLO   1,890,069
CHARLOTTE RUSSE CUP FILLING MACHINE
Original Filed Aug. 24, 1929   6 Sheets-Sheet 1

Inventor
Louis Triolo
By his Attorney
A. A. de Bonneville

Dec. 6, 1932. L. TRIOLO 1,890,069
CHARLOTTE RUSSE CUP FILLING MACHINE
Original Filed Aug. 24, 1929 6 Sheets-Sheet 4

Inventor
Louis Triolo
By his Attorney
A A de Romeville

Dec. 6, 1932.                L. TRIOLO                1,890,069
                CHARLOTTE RUSSE CUP FILLING MACHINE
              Original Filed Aug. 24, 1929    6 Sheets-Sheet 5

Patented Dec. 6, 1932

1,890,069

UNITED STATES PATENT OFFICE

LOUIS TRIOLO, OF BROOKLYN, NEW YORK, ASSIGNOR TO IMPERIAL PAPER BOX CORPORATION, OF BROOKLYN, NEW YORK, A CORPORATION OF NEW YORK

CHARLOTTE RUSSE CUP FILLING MACHINE

Application filed August 24, 1929, Serial No. 388,124. Renewed March 30, 1932.

This invention relates to a charlotte russe cup filling machine.

The object of the invention is the production of a machine with which cups can be filled with cream and the like, said cream being deposited into said cups in pyramidal form, said pyramids comprising zigzag portions. The second object of the invention is the production of means, which will fill a predetermined number of cups with cream and the like. The third object of the invention is the production of a machine for filling cups with cream and the like in pyramidal spiral curved portions. The fourth object of the invention is the production of a machine with which a plurality of cups will be filled with equal amounts of cream, fondant and the like.

Fig. 3$^a$ shows a top view of the cream when deposited in cups with zigzag portions; Fig. 3$^b$ shows a view similar to Fig. 3$^a$ with the cream in the form of pyramidal spirals; Fig. 5 indicates a front view of the lower portion of the machine on an enlarged scale; Fig. 5$^a$ shows a section of Fig. 12 on the line 5$^a$—5$^a$; Fig. 6 is an enlarged front view of the upper portion of the machine, and a section as on the line 6—6 of Fig. 4; Fig. 6$^a$ shows an enlarged plan view of the end of a cross plate; Fig. 11 is a section of Fig. 12 on the line 11—11; Fig. 12 is an enlarged fragmentary portion of Fig. 4; Fig. 13 shows a section of Fig. 5 on the line 13—13; Fig. 14 shows a section of Fig. 4 on the line 14—14; Fig. 15 represents a section of Fig. 5 on the line 15—15 and Fig. 16 indicates a section of Fig. 5 on the line 16—16.

Figures 11, 12, 13, 14, 15, 16:
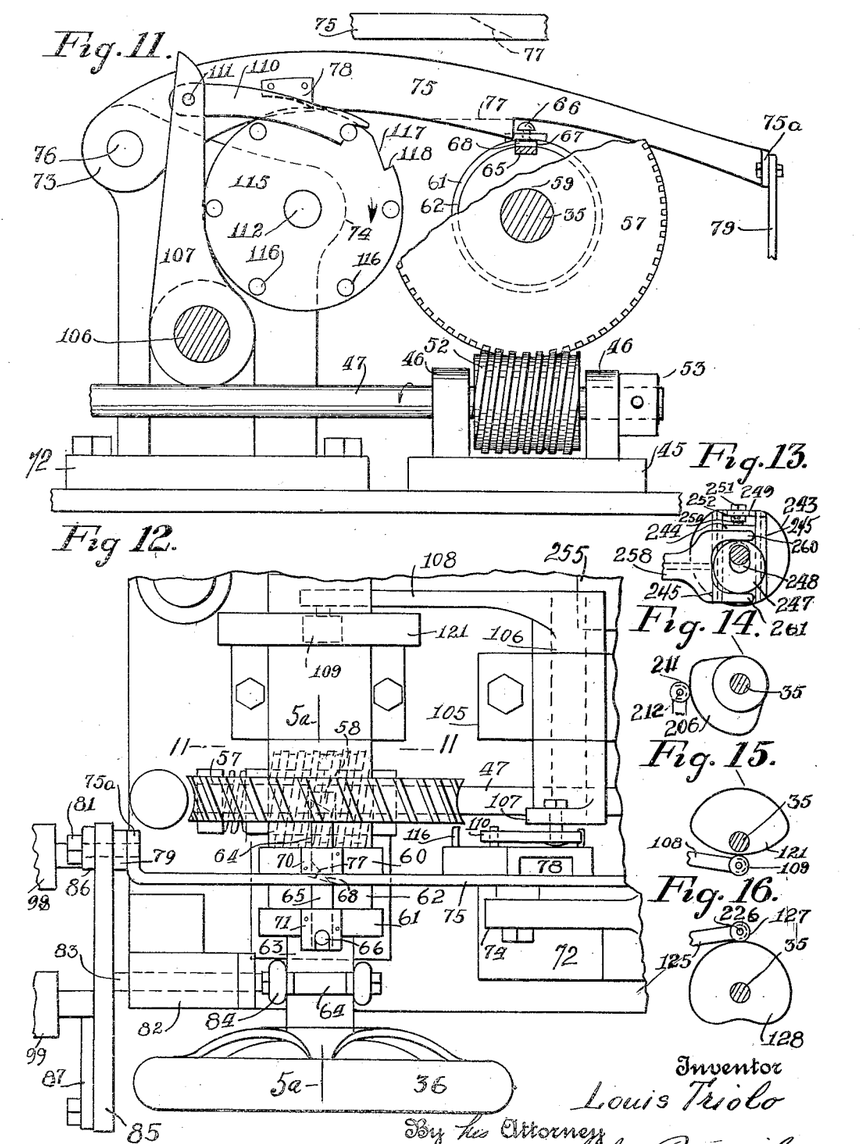

Referring particularly to Figs. 1, 2, 3, 4 and 5, the machine is shown to comprise a supporting frame, having the front member 20 and the similar rear member 21. Each of the members 20 and 21 comprises the angle shaped legs 25 with the connecting portion 26, the feet 27 and the heads 28. The members 20 and 21 are connected on their sides by braces 29, one of which is shown. The heads 28 support and have fastened thereto the table of the machine comprising the portions 30 and 31, by means of screws, not shown. Journal brackets 32, 33 and 34, are supported upon and bolted respectively to the portions 30 and 31 of the table of the machine. The main shaft 35 of the machine is journaled in the journal brackets 32, 33 and 34. An operating hand wheel 36 is fastened to one end of the shaft 35. A supporting bar 39 has its ends supported by the member 21 of the frame and in turn supports the electric motor 40, having the armature shaft 41, to which latter is fastened the pulley 42. To the portion 31 of the table of the machine are bolted the journal bracket 44 and the thrust bearing 45 having formed therewith the journal brackets 46 (see Figs. 1, 4 and 11). A longitudinal worm shaft 47 has one end journaled in the journal bracket 44 and its other end is journaled in the journal brackets 46. A pulley 48 is fastened to the shaft 47. An idler pulley 49 is journaled on a pin 50 extending from the bracket 50$^a$ extending from the rear member 21. A belt 51 connects the pulleys 42 and 48. A worm 52 is fastened to the worm shaft 47. A worm wheel 57 (see Figs. 4, 5$^a$, 11 and 12) having the cavity 58 is supported on the shaft 35 and meshes with the worm 52.

On the main shaft 35 is slidably supported by means of a feather 59, a clutch connection (see Figs. 4, 5$^a$, 11 and 12) comprising a boss having the disc portions 60, 61 with the groove 62 between them. A hub 63 with the groove 64 extends from the disc portion 61. A locking key 65 is supported in the disc portions 60 and 61 and has extending up therefrom a pin 66. The key 65 has a lug 65$^a$ and a thickened portion 67, with the wedge shaped end 68. A spring 69 is located in the cavity 65$^b$ in said boss and bears against the lug 65$^a$ and a wall of the cavity 65$^b$. Covers 70 and 71 are detachably connected to the disc portions 60 and 61 to maintain the key 65 in operative position. The key 65 can lock with the worm wheel 57. On the portion 31 of the table is bolted the journal bracket 72, having formed therewith the bosses 73 and 74. An arm 75 has one end supported on the pin 76 which in turn is supported in the boss 73. The said arm 75 in about its central portion is cut away to form the wedge portion 77.

On the arm 75 is fastened the lug 78. The said arm 75 at its swinging end has formed therewith the flange 75$^a$. A strap 79 (see Figs. 1, 4, 5, 11 and 12) at its top end has formed therewith the elongated opening 80 and through the latter extends the screw 81, which is in threaded engagement with the flange 75$^a$. A journal bracket 82 (see Figs. 1, 4, 5 and 12) is bolted to the portion 31 of the table and supports a shaft 83, from one end of which extends the bifurcated arm 84, and a lever 85 extends from said shaft 83. To the ends of the lever 85 are pinned the top ends of the arms 86 and 87, by means of the screw pins 88 and 89. The screw pin 88 also serves to connect the strap 79 to the lever 85. To the lower ends of the arms 86 and 87 are hinged the treadle arms 90 and 91. To the front member 20 is bolted a bracket 93, and to the latter is bolted a journal bracket 94. The journal bracket 94 supports the pin 95 and to the latter are hinged the treadle arms 90 and 91. The treadle arms support the foot pieces 98 and 99.

A journal bracket (see Figs. 4, 11 and 12) 105 is bolted to and extends up from the portion 31 of the table. A pivot 106 is supported in the bracket 105 and at one end of the latter is fastened the arm 107, and to the other end of the pivot 106 is fastened the arm 108. A roller 109 is journaled to the end of the arm 108. A pawl 110 is pinned to the arm 107 by means of the pin 111. The boss 74 of the bracket 72 supports the pin 112, on which latter is journaled the disc 115. The disc 115 has extending from one side thereof the pins 116, and has formed in its circumferential surface the cut-out portion 117 with the heel 118.

On the main shaft 35 is fastened the cam 121 (see Figs. 4 and 12) against which the roller 109 of the arm 108 bears. A spring 122 extends between the arm 108 and the top portion of the journal bracket 34.

A journal bracket 123 (see Figs. 4 and 5) is bolted to the portion 31 of the table. A pivot 124 is supported in the journal bracket 123 and has fastened thereto the arm 125. A pin 126 extends from the arm 125 and has journaled thereon the roller 127. A cam 128 is fastened to the shaft 35 and the roller 127 bears on the cam 128. A spring 129 has its ends connected to the arm 125 and the journal bearing 34. A connecting rod 132 has one end pinned to the arm 125. To the lower faces of the portions 30 and 31 of the table of the machine, (see Figs. 1 and 5) is bolted the journal bracket having the portions 135 and 136. In the journal bracket having the portions 135 and 136, is supported the shaft 137. A bell crank having the arms 138 and 139 is fastened to the pin 137. From the outer end of the arm 138 extends the pin 140. The lower end of the connecting rod 132 is supported on the pin 140. An elongated opening 142 is also formed in the arm 138 and supports a pin 143. Tubular guide brackets (see Figs. 1, 4, 5, 6 and 9) 144 and 145 are supported on the portions 31 and 30 of the table and have guided therein the table legs 146 and 147. The lower end of the leg 146 is connected to the pin 143. An arm 148 similar to the arm 138 is fastened to the other end of the pin 137, and at the outer end of the arm 148 is supported the pin 149, which in turn supports the table leg 147.

A journal bracket 150 (in Fig. 1) similar to the bracket having the portions 135 and 136 is bolted to the lower face of the portions 30 and 31. A shaft 155 similar to 137, is journaled in the bracket 150. To one end of the shaft 155 is fastened a bell crank having the arms 156 and 157 similar to the bell crank having the arms 138 and 139. A connecting rod 158 connects the pins 159 and 160 on the arms 139 and 157. Tubular guide brackets 161 and 162 are bolted to the portions 31 and 30. A table leg 163 is guided in the bracket 161 and a table leg 164 is guided in the bracket 162. A pin 165 extends from the lower end of the table leg 163 and engages an elongated opening 166 in the arm 156. On the other end of the shaft 155 is fastened an arm, not shown, similar to 148. From the table leg 164 extends a pin, not shown, similar to 165 which engages an elongated opening (not shown) similar to 166 in the arm 156.

A pair of table-members are indicated (see Figs. 1 and 5) at 168 and 169, which respectively have fastened thereto the reinforcing strips 170 and 171. The strip 170 is fastened to the top ends of the table legs 146 and 163, by screws not shown, and the strip 171 is fastened to the table legs 147 and 164. Guide angle irons 172 and 173 are respectively fastened to table members 168 and 169.

Posts 175, 176 and 177 (see Figs. 4 and 5) extend up from the portion 31 and have fastened thereto at their top ends the supplementary table 178. Posts 179 and 180 and the bracket 181 are fastened to and extend up from the portion 30 and support the supplementary table 182, similar to 178.

A dovetail strip 185 (see Fig. 4) is fastened to the portion 31 of the table of the machine, and has extending up therefrom the bolt 186.

A bracket is shown with the journal hub 187, and the foot 188. The latter has a longitudinal dovetail opening in its lower face which engages the strip 185. An elongated opening 189 is made in the foot 188 through which the bolt 186 passes, and the nut 190 on said bolt 186 clamps the foot 188 in place. A shaft 195 is fastened in the hub 187. A sprocket chain wheel 196 is supported on the shaft 195 and a similar sprocket chain wheel 197 is supported on the shaft 35. Posts 198 and 199 (see Figs. 4 and 6) are fastened to and extend up from the portion 31 of the table of the machine, and have fastened thereto the cross bars 200 and 201. A longitudinal plate 202 is supported upon and fastened to the bars 200 and 201 and guide bars 203 are fastened to the plate 202. A sprocket chain 204 engages the sprocket chain wheels 196 and 197. The said sprocket chain has fastened thereto the pushers 205 (see Fig. 1).

A cam 206 (see Figs. 4, 5, 7, 10 and 14) is fastened to the shaft 35. A journal bracket 208 is bolted to the member 30 of the table. A pin 209 is supported in the journal bracket 208 and in turn supports one end of the arm 210. A roller 211 is journaled on a pin 212 extending from the arm 210. On the shaft 195 is supported the ratchet wheel 216 having the ratchet teeth 217. The ratchet wheel 216 is fastened to the sprocket chain wheel 196 by screws not shown. An arm (see Figs. 4, 6, 7 and 8) comprising the portions 220 and 221 has its lower end supported on the shaft 195. To the portion 221 are pinned the pawls 222 and 223. On the portion 220 is pinned the latch having the body portion 228 with the projecting finger 229, and the extension 230. A spring 231 has its ends connected to pawl 222 and the portion 221. A spring 232 has its ends connected to the pawl 223 and the portion 221. A connecting rod is indicated to comprise the members 235 and 236. The member 236 has formed therein an elongated opening 237. A screw pin 238 extends through the opening 237 and connects the members 235 and 236. The member 236 is pinned to the arm 210 by means of bolt 239.

On the main shaft 35 (see Figs. 4, 5 and 13) is fastened an eccentric having the disc portion 243. A slide 244 is guided on disc portion 243, between the guide strips 245. A boss 246 extends from the slide 244 and a disc 247 extends from the boss 246. An elongated opening 248 extends through both said boss 246 and disc 247. A plate 249 extends from the disc 243. A screw 250 having the head 251 and collar 252 extends through an opening in the plate 249 and is in threaded engagement with the slide 244, to vary the throw of the eccentric.

Journal brackets 254 and 255 (see Figs. 1, 4 and 7) are respectively supported upon and bolted to the portions 30 and 31 of the table of the machine. A shaft 256 is journaled in the journal brackets 254 and 255. On one end of shaft 256 is fastened the lever having the arms 258 and 259. The arm 258 has formed therewith a bifurcated end having the prongs 260 and 261 which engage the disc 247. On the other end of the shaft 256 is fastened the arm 262.

To the ends of arms 259 and 262 are respectively pinned the lower ends of the connecting rods 265 and 266, and the upper ends of said rods 265 and 266 are supported on the screw pins 268 and 269 extending from the cross head 270. A pair of brackets 272 and 273 (see Figs. 1, 4 and 7) are respectively bolted to the members 30 and 31 of the table of the machine. Angle shaped uprights 278 and 279 have their lower ends fastened respectively to the brackets 272 and 273. A brace 280 connects the upper ends of the uprights 278 and 279. A pair of similar guide brackets are each indicated with the jaws 281, 282 and the foot 283. The feet 283 are bolted to the uprights 278 and 279. The cross head 270 is guided between the jaws 281 and 282 of the said brackets. The cross head 270 is U-shaped in cross section and has bolted thereto the bottom plate 284. End plates 285 and 286 are fastened to the ends of the cross head 270 by screws, not shown. An angle iron plate 288 is detachably connected to the top of the cross head 270 by means of the bolt 289. A guide plate 290 is fastened to the top of the cross-head 270 for the angle iron plate 288.

Threaded spindles 291 extend through openings in the plate 284 and carry the jam nuts 292 and 293.

A cylinder support 298 has formed at its ends the lugs 299, which latter are bolted to the uprights 278 and 279 by means of the bolts 300. The support 298 (see Figs. 1, 2, 3 and 6) has formed therein, in this instance, four cylindrical openings 301 and the pairs of ports 302 and 303 diametrically opposite each other. Guide flanges 304 are formed with the support 298. Cylinders 305 have formed therewith at about their central portions the actuating arms 306 and are located in the cylindrical openings 301. Pins 307 extend from the arms 306. Pairs of ports 308 and 309 are formed in the lower ends of the cylinders 305. A guide strip 310 is detachably fastened to the upper portion to the flange 304 and guide strips 311 and 312 are fastened to the lower end of the support 298. A discharge manifold 315 is bolted to the front face of the support 298, and has formed therein a port 316 opposite each of the ports 303. Each of the ports 316 joins with the vertical port 317. With the lower end of each port 317 is formed the nipple 318. A piston 320 is seated in each of the cylinders 305. The lower ends of the threaded spindles 291 are in threaded engagement with the piston 320 and are clamped in place by means of the jamb nuts 321 and 322. A link 323 connects the pins 307. A cam housing 324 (Figs. 4, 5, 7 and 10) is fastened to the main shaft 35 and has formed in one face thereof the cam groove 325, and on its periphery the cam 327. A journal bracket 328 extends up from and is bolted to portion 30 and has supported therein one end of the link 329 by means of the pin 330. To the upper end of the link 329 is pinned the connecting rod 331 by means of the pin 332. A roller 333 is journaled to the link 329 and engages the cam groove 325. A pair of journal brackets 336 and 337 (see Figs. 4, 6 and 7) are bolted to the upright 278 and have journaled therein the vertical spindle 338. To the upper end of the spindle 338 is fastened the hub of the arm 339. The swinging end of the arm 339 is pinned to the link 323 by means of the pin 340.

A journal bracket (see Figs. 4 and 7) 342 is bolted to the portion 30 and has supported therein one end of the arm 343 by means of the pin 344. A roller 345 is journaled to the bracket 346 that extends from the arm 343 and bears against the peripheral cam 327. One end of the link 348 is pinned to the arm 343 by means of the pin 349. Journal brackets 350 are bolted to the portions 30 and 31 and have supported therein the horizontal shaft 351. To the ends of the shaft 351 are fastened the arms 352 having the enlarged upper ends 353. The other end of the link 348 is pinned to one of the arms 353 by means of the pin 354. A cross plate 355 has formed therein a plurality of circular openings 356 and has formed therewith the angular ends 357, which are bolted to the upper faces of the ends 353 of the arms 352. The cross plate 355 with its actuating parts, I herein term a vibrator.

To the nipples 318 of the manifold 315 are detachably connected the upper ends of the flexible conduits 362 (generally pieces of rubber tubing). To the lower ends of the conduits 362 are detachably connected the outlet nozzles 364 having the serrated ends 365. The nozzles 364 extend through the openings 356 of the cross plate 355.

To the lower end of the spindle 338 (see Figs. 4, 6 and 7) is fastened the hub of the arm 366. The connecting rod 331 has one end pinned to the arm 366 by means of the pin 368.

U shaped brackets (see Figs. 1, 6 and 7) are shown having the vertical members 371 and the horizontal legs 372 and 373. The horizontal legs 372 are fastened to the strips 170 and 171 of the table members 168 and 169. A pair of angle shaped guides having the horizontal leg 374 and the vertical legs 375 are fastened to horizontal legs 373 of the U shaped brackets by means of the screws 376.

A detachable reservoir (Fig. 1) 377 having the detachable cover 378 is shown having the side walls 380, the front wall 381 and the rear wall 382. At the lower end of the front wall 381 is formed the discharge nozzle 383, which is in line with the ports 302 of the support 298. From the front wall 381 extend a pair of hooks 384. From the inner faces of the uprights 278 and 279 extend the brackets 385. Screws 386 are in threaded engagement with the brackets 385 and their ends can bear against the hooks 384. A hook bar 388 has formed therewith the hooks 389. The said hook bar 388 is fastened to the wall 381 of the reservoir 377. The hooks 389 are detachably supported upon the brace 280. A gasket 390 is interposed between the nozzle 383 and the adjoining face of the cylinder support 298.

To use the machine the reservoir 377 is located in operative position, with the hooks 389 supported on the brace 280. The hooks 384 are engaged with the brackets 385, and the screws 386 have their ends brought up against the hooks 389. Next cream, fondant and the like is poured into said reservoir 377.

Boxes 395 containing partially filled charlotte russe cups 396 are located upon the table members 168 and 169, between the guide angle irons 172 and 173. The electric motor 40 is started by closing a switch, not shown, and thereby through the belt 51 the worm shaft 47 is rotated. The worm wheel 57, which is loose on the main shaft 35 thereby rotates.

The operator now bears on the foot piece 98 and thereby the bifurcated arm 84 swings in the direction of the arrow A, by virtue of which the locking key 65 engages the cavity 58 of the worm wheel 57, and thereby the main shaft 35 is turned. The cam 121 turns with the shaft 35, which causes the arms 107 and 108 to oscillate. By means of the pawl 110 engaging the pins 116, and in the present instance when the main shaft 35 makes one turn, the disc 115 makes one sixth of a turn. In other words the disc 115 makes one complete revolution for six revolutions of the shaft 35. After the disc 115 makes one revolution the lug 78 on the arm 75 engages the cutout portion 117 of the disc 115, the arm 75 lowers and the wedge portion 77 enters the groove 62 and engages the end 68 whereby said key 65 is disengaged from the worm wheel 57 and the main shaft 35 stops turning. While the shaft 35 is turning, the cam 206 oscillates the connecting rod having the members 235 and 236, whereby in one instance the pawls 222 and 223 function with the teeth 217 of the ratchet wheel 216 and turn the latter. The sprocket chain wheel 196 turns with the ratchet wheel 216 and the sprocket chain 204 moves with its pushers 205. One of the said pushers 205 bears against the rear wall of one of the boxes 395 containing the charlotte russe cup 396. In this instance each of the boxes 395 contains four rows of six charlotte russe cups 396, and intermittently moves the same six times, each the distance between the axial centers of a pair of the cups on each of the rows of six. At the same time the cream or fondant is discharged from the outlet nozzles 383. The said cream or fondant enters the flexible conduits 362, flows through the ends 365 into the charlotte russe cups 396. While the cream or fondant is discharging from the ends 365 the table members 168, 169 descend whereby the box 395 with the charlotte russe cups 396 is lowered.

The pawls 222 and 223 are disposed in relation to the ratchet wheel 216 (see Fig. 8) so that when the peak $a$ of the pawl 222 engages the radial face of one of the teeth 217 of said ratchet wheel, the peak $b$ of the pawl 223 is upon the crown of one of said teeth. When the pawls are located, as shown, particularly in Fig. 8, the ratchet wheel 216 is turned by its coaction with the peak $a$ of the pawl 222, and thereby the sprocket chain 204 is moved in this instance a horizontal distance of two and three quarter inches, for each forward movement of the connecting rod having the members 235 and 236. In case the sprocket chain 204 is to be moved a shorter distance for smaller cups for each movement of said connecting rod, the pawl 222 is moved and held out of engagement with the ratchet wheel 216 by means of the finger 229 of the latch having the body portion 228, being located under said pawl 222. In this latter case when the connecting rod having the members 235 and 236 starts a forward movement, the peak $b$ of the pawl 223 rides on the crown of one of the teeth 217 of the ratchet wheel 216, until it engages a radial face of a tooth of the ratchet wheel, to turn the latter and thereby the ratchet chain wheel 196 is given a shorter movement.

The cam 128 fastened to the shaft 35 turns with the latter whereby the arm 125 is oscillated. The connecting rod 132 moves with the arm 125. The rod 132 oscillates the bell crank arm 138, whereby the table legs 146 and 147 are moved. The oscillations of the bell crank arm 139 are transmitted to the bell crank arm 157, whereby the bell crank arm 156 is oscillated. By this means the arm 148 and the similar arm on the shaft 155 are oscillated. By this means the table legs 146, 147, 163 164 are reciprocated, which causes the table members 168 and 169 to move up and down. During the descent of the table members 168 and 169 the outlet nozzles 364 are vibrated. With the rotation of the shaft 35 the cam housing 324 turns, and thereby the cam 327 oscillates the arm 343, and the link 348 oscillates the arms 352. The latter vibrates the cross plate 355 and thereby the outlet nozzles 364. The serrated ends 365 of the outlet nozzles 364 form ornamental creases 365a in the portions of the cream or fondant as the table members 168 and 169 lower. Also it is to be noted that the table members 168 and 169 when they lower by virtue of the shape of the cam 128, increase in speed during their descent to shape the cream or fondant in the form of a pyramid.

When the foot pieces 98 and 99 are brought in the same horizontal plane, the arm 86 being raised prevents the arm 75 swinging to its lowest position, and thereby prevents the wedge 77 engaging the thickened portion 67 of the locking key 65, whereby the shaft 35 continuously rotates. To stop the machine, the operater bears on the foot piece 99, which swings the bifurcated arm 84 in a direction opposite to the arrow A and thereby the locking key 65 is disengaged from the worm wheel 58.

With the rotation of the shaft 35, the disc 247 revolves and thereby the levers having the arms 259 and 262 oscillate. The connecting rods 265 and 266 reciprocate with the oscillations of the arms 259 and 262, by means of which the cross head 270 is reciprocated. The pistons 320 reciprocate with the cross head 270. By this means when the link 323 locates the ports 308 in open position, with the pistons 320 rising, the cream or fondant enters the lower portion of the cylinders 305, from the reservoir 377, the ports 309 being closed. When the pistons 320 are on their down stroke, the ports 309 are opened and the ports 308 are closed, whereby the cream or fondant is discharged from the outlet nozzles 364 and enters the charlotte russe cups.

During the down strokes of each of the pistons 320, equal amounts of fondant or cream are discharged from the serrated ends 365 of the outlet nozzles 364. By this means the charlotte russe cups 396 are all charged with equal amounts of fondant or cream.

Figure 3B:
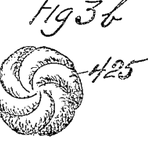
Figure 4:
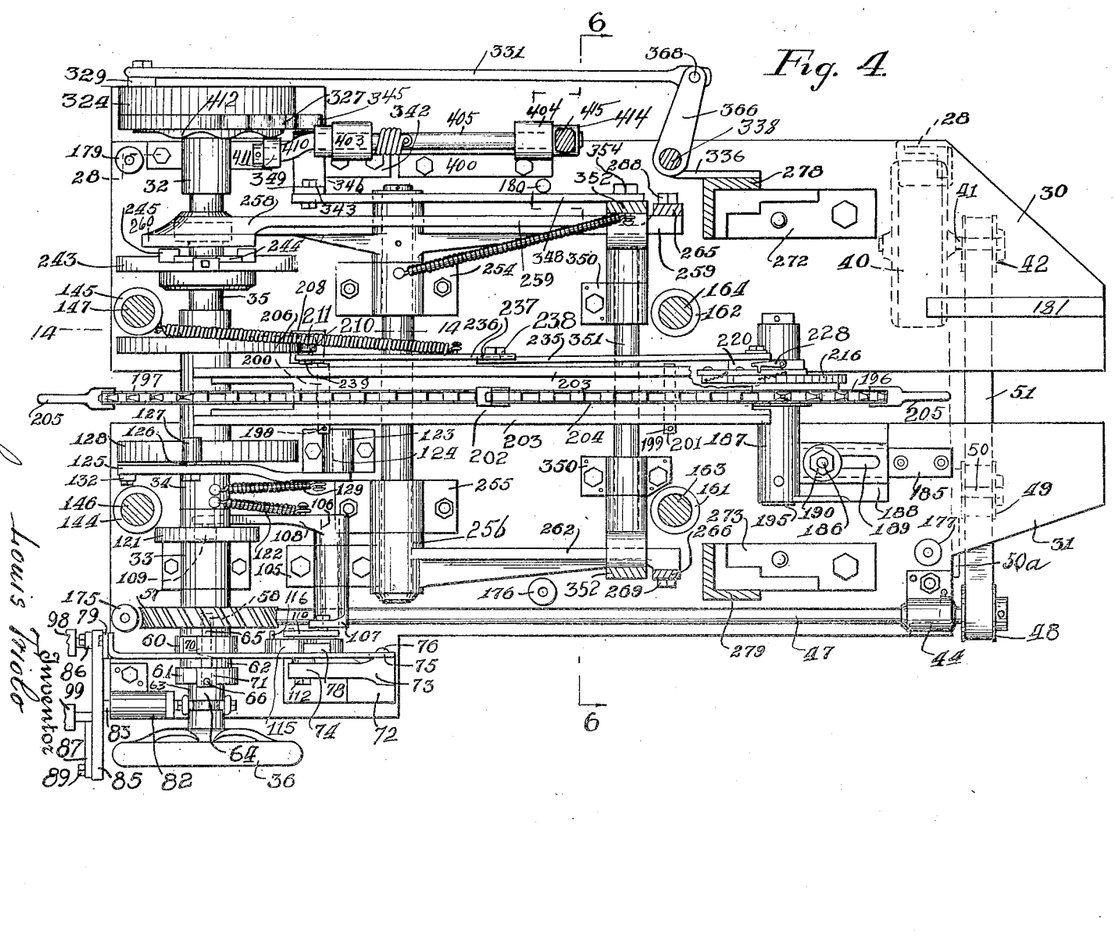
Fig. 4 shows a partial enlarged top plan view and section of Fig. 1 on the line 4—4.
Figures 5, 5A:
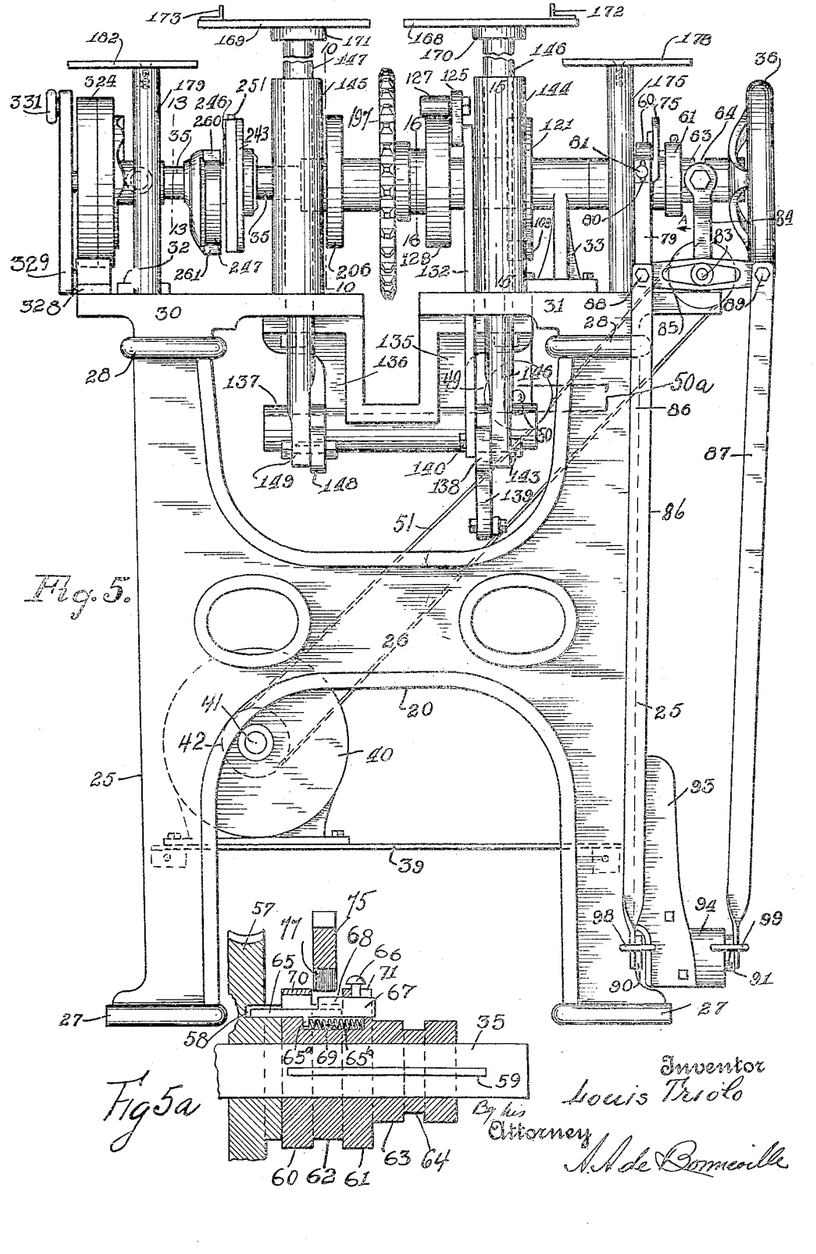
Figures 6, 6A:
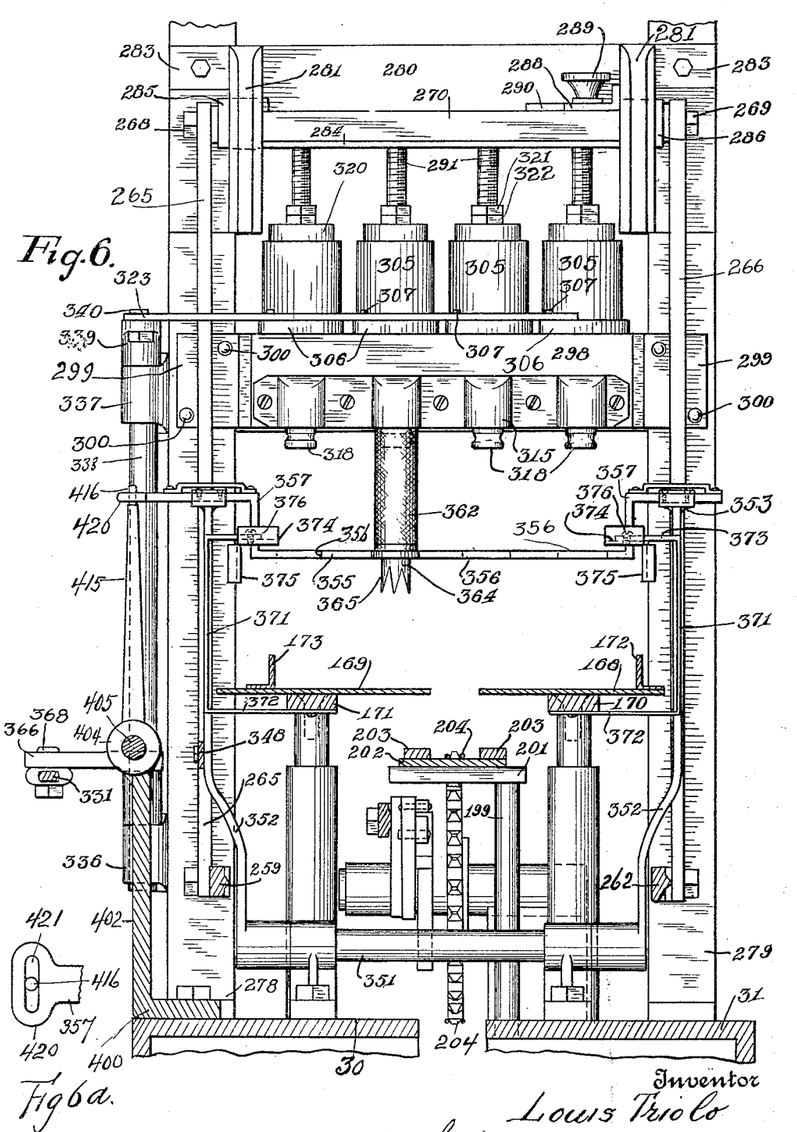
Figures 7, 8, 9, 10:
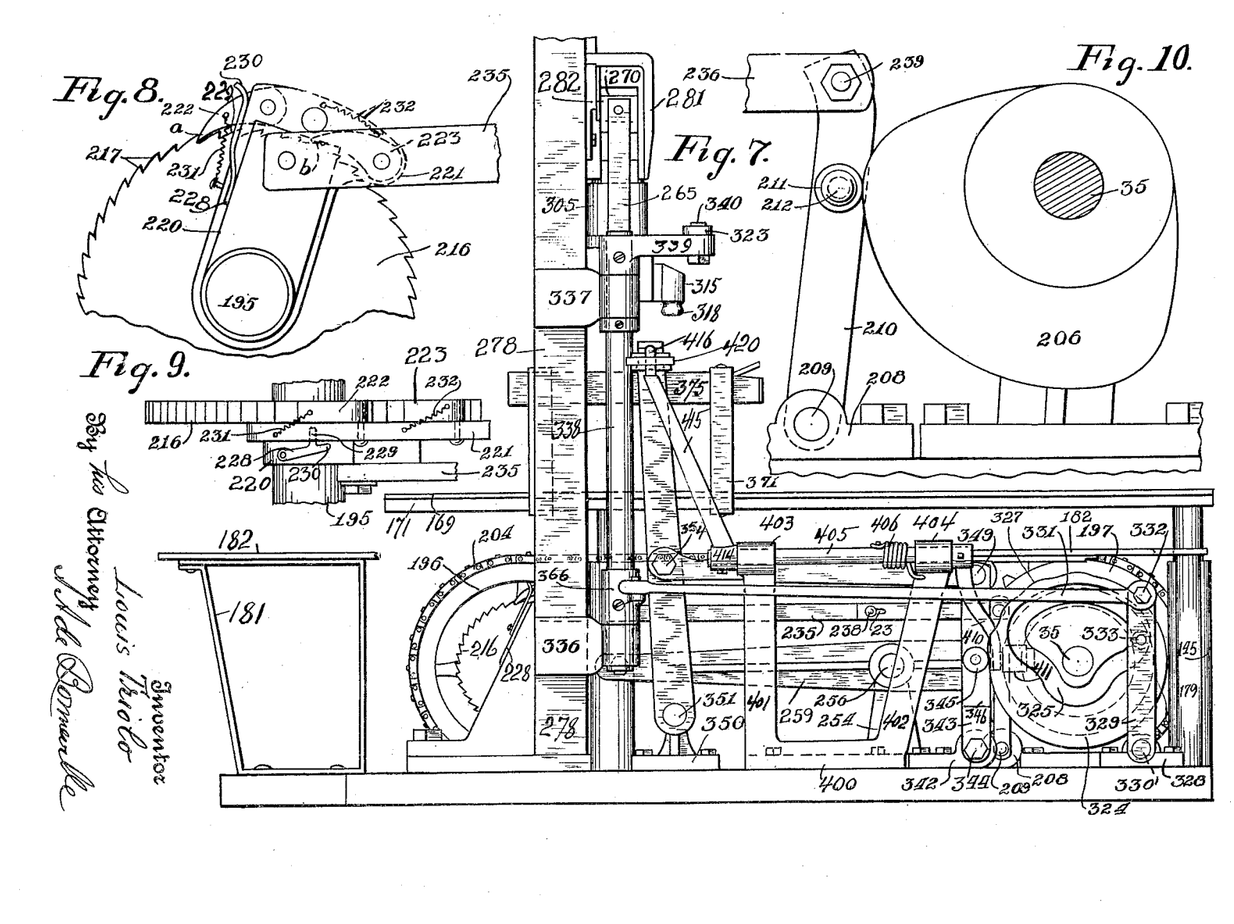
Fig. 7 is a left hand side view of the machine with some elements omitted.
Fig. 8 indicates an enlarged side view of a ratchet wheel with its pawls and appurtenances.
Fig. 9 shows a top view of Fig. 8.
Fig. 10 represents an enlarged section of Fig. 5 on the line 10—10.

Referring to Figs. 4, 6 and 7, if desired, vibrations may be imparted to the cross plate 355 at right angles to the vibrations imparted to said cross plate 355 by the arms 352. To obtain the said vibrations, a bracket 400 is fastened to the portion 30. The said bracket has formed therewith the arms 401 and 402 with the journal bearings 403 and 404. A spindle 405 is journaled in the bearings 403 and 404. A spring 406 has one end fastened to the spindle 405 and its other end bears against the arm 402. An arm 410 has one end fastened to the spindle 405 and at its other end is journaled a roller 411. A cam 412 extends from the housing 324 and against which the roller 411 bears. A sleeve 414 is fastened to the spindle 405 and has extending therefrom the arm 415 with the pin 416 at its top end. One of the angular ends 357 has formed therewith the elongated head 420 with the elongated opening 421. The pin 416 extends through the opening 421. When the housing 324 turns the spindle 405 is oscillated, by virtue of the roller 411 bearing against the cam 412 and thereby the cross plate 355 is reciprocated in directions parallel to its longitudinal axis. By this means the cross plate 355 is vibrated in directions parallel to its longitudinal axis and at right angles thereto, imparting a circular movement to the serrated ends 365, and by virtue of the descent of the table members 168 and 169, with speeds that increase during the lowering of said tables the fondant or cream will be deposited into said cups 396 in the form of pyramidal spirals as indicated at 425 in Fig. 3b.

Figures 1, 2, 3:
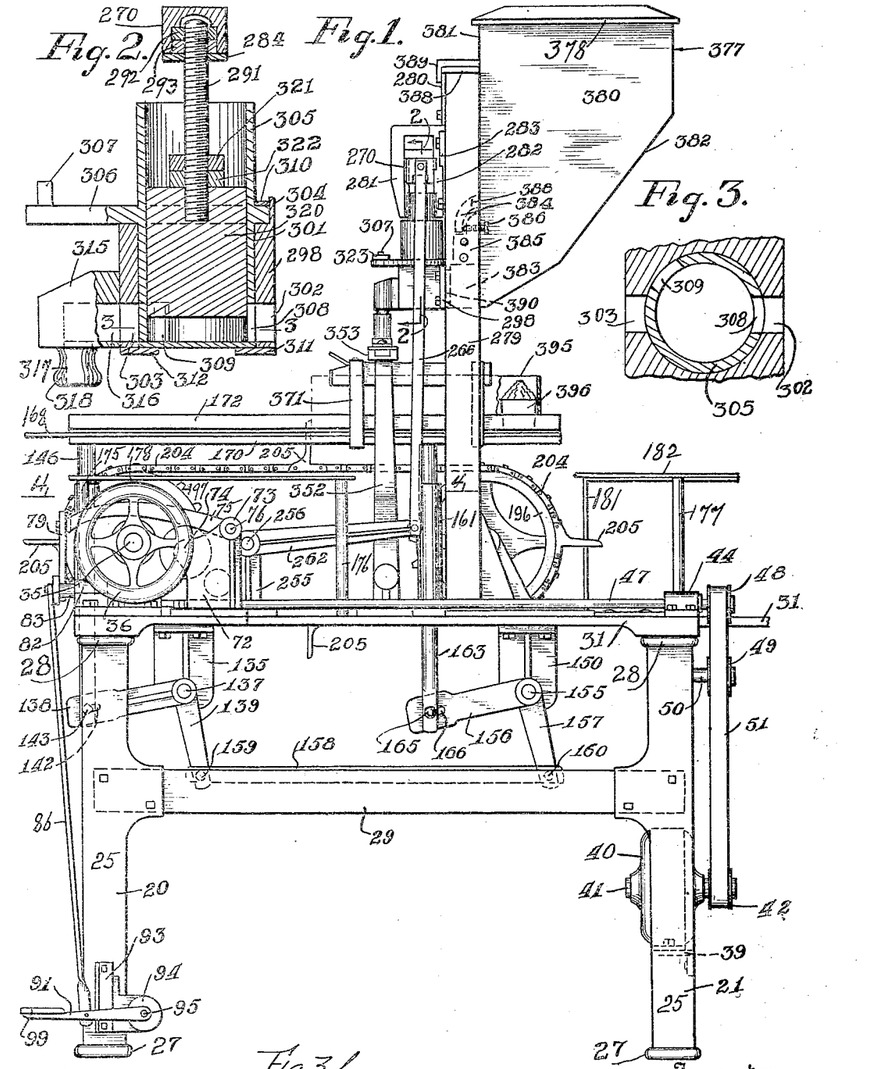
Fig. 1 represents an elevation of the right hand side of the charlotte russe cup filling machine.
Fig. 2 is an enlarged section of Fig. 1 on the line 2—2.
Fig. 3 is a section of Fig. 2 on the line 3—3.
Figure 3A:
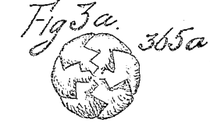

It will be noted that the arm 415 may be disconnected from the spindle 405, and then the fondant or cream will be deposited in the cups 396 with zigzag portions 365a as shown in Fig. 3a.

Various modifications may be made in the invention and the present exemplification is to be taken as illustrative and not limitative thereof.

Having described my invention what I desire to secure by Letters Patent and claim is:

In a machine of the character described the combination of a frame, vertically reciprocating table members extending up from the frame, said table members adapted to slidably support boxes containing cups, means to move the boxes with their cups on the table members, a reservoir adapted to contain cream and the like supported in the machine over the path of said boxes, means to draw said cream and the like from said reservoir and discharge into said cups in equal amounts, flexible conduits extending from the latter means, an outlet nozzle fastened to the outlet end of each conduit, a cross plate having openings located below said nozzles, said outlet nozzles inserted in said openings, means to vibrate said cross plate simultaneously in directions parallel to its longitudinal axis and at right angles thereto, whereby said cream or fondant is deposited into said cups in the form of pyramidal spirals.

Signed at the borough of Brooklyn, city of New York, in the county of Kings and State of New York this 29th day of July A. D. 1929.

LOUIS TRIOLO.